(12) United States Patent
Dumas et al.

(10) Patent No.: US 7,654,085 B2
(45) Date of Patent: Feb. 2, 2010

(54) SYSTEM OF AN INDUCED FLOW MACHINE

(76) Inventors: Elijah Dumas, 1304 S. Winchester Blvd., #181, San Jose, CA (US) 95128; Elisha Dumas, 1304 S. Winchester Blvd., #181, San Jose, CA (US) 95128; Howard Dumas, 1304 S. Winchester Blvd., #181, San Jose, CA (US) 95128

( * ) Notice: Subject to any disclaimer, the term of this patent is extended or adjusted under 35 U.S.C. 154(b) by 53 days.

(21) Appl. No.: 11/510,468

(22) Filed: Aug. 28, 2006

(65) Prior Publication Data
US 2008/0047266 A1 Feb. 28, 2008

(51) Int. Cl.
*F02B 33/44* (2006.01)
*F02C 6/18* (2006.01)
*F02C 7/12* (2006.01)
*F02B 23/00* (2006.01)
*F02B 37/00* (2006.01)
*F02B 37/12* (2006.01)

(52) U.S. Cl. ............... 60/606; 60/611; 60/785; 60/806; 123/585

(58) Field of Classification Search ........ 60/605.2, 60/606, 611, 785, 806; 415/199.2, 214.1, 415/220; 137/624.27, 625.41; 123/585; 701/103
See application file for complete search history.

(56) References Cited

U.S. PATENT DOCUMENTS

| 2,473,356 A | * | 6/1949 | Birmann | 415/199.2 |
| 3,029,064 A | * | 4/1962 | Buckingham | 415/47 |
| 4,046,492 A | | 9/1977 | Inglis | 417/197 |
| 4,259,840 A | * | 4/1981 | Tenney | 60/611 |
| 4,674,283 A | * | 6/1987 | Ishida et al. | 60/606 |
| 5,063,733 A | * | 11/1991 | Jackson et al. | 60/806 |
| 5,064,423 A | | 11/1991 | Lorenz et al. | 60/611 |
| 5,287,694 A | * | 2/1994 | Davis et al. | 60/785 |
| 5,402,938 A | | 4/1995 | Sweeney | 239/431 |
| 5,553,995 A | * | 9/1996 | Martinez | 415/1 |

(Continued)

FOREIGN PATENT DOCUMENTS

DE 3718579 A1 * 12/1988

(Continued)

OTHER PUBLICATIONS

The review entitled "The Coanda Effect~US Patents" describes examples of the use of various versions of air amplifiers with Coanda profiles, including a nozzle type air amplifier (http://www.rexresearch.com/coanda/lcoanda.htm).

(Continued)

*Primary Examiner*—Thai Ba Trieu

(57) ABSTRACT

A system of an internal combustion engine which is induced by an air flow amplifier via a turbine and centrifugal compressor, one side of which is mechanically and pneumatically connected to the turbine and the other side with an air intake of the internal combustion engine. The operation of the engine induction system can be enhanced by using an intercooler that supplies a cooled primary flow of compressed air to the air amplifier. The use of the engine induction system without a turbocharger and, hence, without hot exhaust gases, makes it possible to utilize light magnesium alloys for parts of the turbine and compressor and thus to reduce the weight of the system as a whole.

21 Claims, 12 Drawing Sheets

U.S. PATENT DOCUMENTS

| | | |
|---|---|---|
| 5,638,796 A | 6/1997 | Adams, III et al. |
| 5,753,805 A * | 5/1998 | Maloney ................... 701/103 |
| 5,819,538 A | 10/1998 | Lawson, Jr. ................. 60/611 |
| 6,394,076 B1 * | 5/2002 | Hudelson ................... 123/563 |
| 6,444,345 B2 * | 9/2002 | Sang ........................ 429/34 |
| 6,470,864 B2 * | 10/2002 | Kim et al. ................. 60/605.2 |
| 6,568,203 B1 * | 5/2003 | Leathers .................... 62/402 |
| 6,638,008 B2 * | 10/2003 | Sathianathan et al. .... 415/214.1 |
| 6,826,910 B1 | 12/2004 | Easton ....................... 60/597 |
| 7,013,879 B2 * | 3/2006 | Brookshire et al. ........ 60/605.2 |
| 7,028,677 B2 | 4/2006 | Martin |
| 7,043,913 B2 | 5/2006 | Nishiyama et al. |
| 7,216,661 B2 * | 5/2007 | Welty et al. ............ 137/625.41 |
| 7,314,043 B1 * | 1/2008 | Berger et al. ................ 123/585 |
| 7,334,397 B2 * | 2/2008 | Blomquist ................. 60/605.2 |
| 7,341,050 B2 * | 3/2008 | Yi ............................ 123/563 |
| 2007/0277888 A1 * | 12/2007 | Scanlon ................. 137/624.27 |
| 2008/0178592 A1 * | 7/2008 | Bering ..................... 60/605.1 |

FOREIGN PATENT DOCUMENTS

| | | | |
|---|---|---|---|
| EP | 561212 A2 * | 9/1993 | |
| GB | 2233037 A * | 1/1991 | |
| GB | 2252128 A * | 7/1992 | |
| JP | 59101539 A * | 6/1984 | |
| JP | 60013934 A * | 1/1985 | |
| JP | 2000054850 A * | 2/2000 | |
| JP | 2005220862 A * | 8/2005 | |

OTHER PUBLICATIONS

An example of re-usable and freezable packaged chiller medium is a product marketed by Rubbermaid, Inc. of Wooster, Ohio under the trade name Blue Ice.

* cited by examiner

SYSTEM OF AN INDUCED FLOW MACHINE

BACKGROUND OF THE INVENTION

1. Field of Invention

This invention relates to the field of fluid flow amplifiers and, in particular, to fluid flow amplifiers in combination with machines the operation of which requires supply of a gas flow. An example of such a machine is an air compressor, e.g., in the form of a turbocharger for enhancing supply of air to a combustion engine. More specifically, the invention relates to a fluid flow amplifier for moving a cold, powerful atmospheric centripetal airflow across a turbine of the turbocharger. The fluid flow amplifier allows for the entire rotating assembly of the turbocharger to be made of super-light-weight materials that are not concerned with heat issues of hot exhaust gases from a combustion engine. The reduction of weight gives the turbocharger super low inertia characteristics with rapid transit response ability and ideal power consumption for operation.

2. Prior Art

Such devices as a centrifugal blower or a turbocharger are known as dynamic air compressors. An impeller being a working element of the compressor needs to rotate at a high speed such that ambient air is drawn into the center of the impeller and then is thrown off the periphery of the impeller at a high speed. A diffuser known as a convergent-to-divergent nozzle slows the high velocity air down and exchanges it for an increase of pressure. A turbocharger is a device driven by exhaust gases typically flowing from a combustion engine. Normally, a centrifugal blower has a larger impeller than a turbocharger and is driven off the crankshaft via a pulley and belt or through a gearing system in order to obtain a high impeller velocity. Centrifugal blowers can also be powered by other means such as electric motors via a belt or gearing transmission.

Compressed air produced from the turbocharger or centrifugal blower can be used for pneumatic applications, e.g., for increasing power output due to supply of an induced air flow.

In a simplified schematic form, the existing arrangements of a turbocharger or another machine, such as a centrifugal blower that is used for enhancing operation of an internal combustion engine or for creating a flow of compressed air for other possible purposes, can be illustrated by arrangements shown in FIGS. 1 to 3 below.

FIG. 1 is a simple schematic view illustrating a known arrangement consisting of an internal combustion engine and a turbocharger powered by exhaust gas from the exhaust system of the engine. The arrangement shown in FIG. 1 consists of an internal combustion engine 10 having an air intake 12 and an exhaust outlet 18. The exhaust outlet 18 is connected to an input of a gas turbine 22 that has an output shaft 28 used for driving a centrifugal compressor 24. The outlet of the centrifugal compressor 24 is connected to the air intake 12.

As the internal combustion engine 10 operates, hot exhaust gas enters the gas turbine 22 and expands. A flow of exhaust gas from the engine 10 to the turbine 22 is shown in FIG. 1 by arrow 20. An expanded gas that leaves the turbine is shown by arrow 26. The turbine 22 transmits the power provided by the hot exhaust gas 20 to the shaft 28, which transfers the power to the centrifugal compressor 24 which is connected to the shaft 28. The centrifugal compressor 24 begins to spin at high velocity, and a flow of low pressure air shown by arrow 16 is drawn into the centrifugal compressor 24 where it is compressed to a higher pressure. A flow of compressed air shown by arrow 14 is supplied from the centrifugal compressor 24 to the air intake 12 of the internal combustion engine 10. The internal combustion engine 10 sees more air such that more fuel is added, thus producing more output power.

FIG. 2 is a simple schematic view illustrating a known arrangement consisting of an internal combustion engine and a centrifugal blower powered by the crankshaft of the engine. The arrangement consists of an internal combustion engine 10a that has an air intake 12a, an exhaust outlet 18a, a crankshaft 30, and a power transfer mechanism 32, such as a gearing system driven from the engine 10a via the crankshaft 30 and having its output shaft 28a connected to a centrifugal compressor 24a. The outlet of the centrifugal compressor 24a is connected to the air intake 12a of the engine. In operation, the engine 10a drives the power transfer mechanism 32 via the crankshaft 30, and the transfer mechanism 32, in turn, transmits the power to the centrifugal compressor 24a via the shaft 28a. The centrifugal compressor 24a begins to spin at a velocity dependent on the step up ratio of the transfer mechanism 32. The step up ratio can be, e.g., 5:1, meaning the centrifugal compressor 24a will spin 5 times faster than the speed of the crankshaft 30. The speed of the centrifugal compressor 24a is, therefore, depends on crankshaft 30 rpm. Low-pressure air, e.g., atmospheric air shown by arrow 16a, is drawn into the centrifugal compressor 24a and is compressed to a higher pressure flow that is shown by arrow 14a. The high-pressure air flow 14a enters intake 12a of the internal combustion engine 10a and force-inducts the air of the internal combustion engine 10a. The internal combustion engine 10a sees more air such that more fuel is added, thus producing more output power.

Shown in FIG. 3 is a simple schematic view that illustrates how a centrifugal blower can be powered by an electric motor. An electric power source 54 supplies electric power to an electric motor 56. An output shaft 50 of the electric motor 56 is the electric motor 56 is connected to a power transfer mechanism 32b, which can typically be a gearing system, such as a transmission or a pulley system. An output shaft 28b is connected to centrifugal compressor 24b and drives the latter. The centrifugal compressor 24b begins to spin at a velocity that depends on the step up ratio of the power transfer mechanism 32b. The step up ratio between the engine and the centrifugal compressor can be, e.g., 7:1, meaning the centrifugal impeller will spin 7 times faster than the speed of the output shaft 50. The speed of the centrifugal compressor 24b, therefore, depends on the rpm of the electric motor 56. A low-pressure air flow shown by arrow 16b is drawn into the centrifugal compressor 24b and is compressed to a higher pressure. A flow of high-pressure air which is released from the compressor 24b and shown by arrow 14b can be used for pneumatic applications, e.g., for driving a pneumatic tool (not shown). The electrical powered centrifugal blower typically is rarely used as a force induction component for an internal combustion engine due to high electrical power requirements. Therefore, such electric powered centrifugal blowers are used for expensive pneumatic operations.

The above arrangements are embodied into structural designs in the patents mentioned below for illustration purposes.

U.S. Pat. No. 7,028,677 issued in 2006 to Martin presents an external drive supercharger is described. The external drive supercharger includes an impeller, a multibelt pulley adapted to a drive source, an impeller pulley drivingly coupled to the impeller, and an external drive belt having at least one rib coupled to the multibelt pulley to drive the impeller pulley. Further, the external drive assembly includes an adjustable idler engagingly connected to the external drive belt wherein the impeller pulley and the multibelt pulley engage with the at least one rib of the external drive belt.

the radial guide cascade ring are no longer in contact with the wall, so that a direct, unobstructed flow path to an outflow duct is provided in the exhaust-gas turbine.

U.S. Pat. No. 7,028,677 issued in 2006 to Martin discloses an external drive supercharger. The external drive supercharger includes an impeller, a multi-belt pulley adapted to a drive source, an impeller pulley drivingly coupled to the impeller, and an external drive belt having at least one rib coupled to the multi-belt pulley to drive the impeller pulley. Further, the external drive assembly includes an adjustable idler engagingly connected to the external drive belt, wherein the impeller pulley and the multi-belt pulley engage with at least one rib of the external drive belt.

U.S. Pat. No. 5,638,796 issued in 1997 to Adams, III, et al presents an electrically driven supercharger. The electrically driven supercharger described in the above patent comprises a centrifugal blower for compressing air. The blower is mounted on one end of a shaft. A first bearing is provided for supporting the blower on said one end of said shaft in a cantilever fashion. The rotor of an electric motor is mounted on the opposite end of said shaft. A second bearing is provided for supporting the rotor on said opposite end of the shaft in a cantilever fashion. A lubricating fluid container is located between the first and the second bearings for containing a quantity of lubricating fluid. A slinger is also mounted on the shaft, which passes through the lubricating fluid container, for slinging the lubricating fluid against the first and second bearings. The motor, which is a brushless d-c motor, is designed to provide in response to a 50 to 100 volt applied potential, approximately 10 horse power at approximately 60,000 rpm's.

In the field of turbochargers the rotating assembly, which comprises a compressor and a turbine, are typically heavy. This heaviness of the rotating assembly leads inventors to find out ways to help combat turbo lag, which is the time needed for turbocharger to spin up to speed vs. the time the gas pedal is depressed. Turbo lag is caused by the heavy rotating assembly of the turbocharger.

Arrangements of components that enhances pressure differential between the inlet and outlet of a turbocharger system that utilizes a flow of gas to spin up quicker are known in the art.

For example, a device described in U.S. Pat. No. 5,064,423 issued in 1991 to Lorenz et al., supplies compressed air from a pressurized tank to an intake of the internal combustion engine to provide a higher flow of hot expanding gases to enhance the pressure differential, which helps spool the turbocharger quicker.

U.S. Pat. No. 5,819,538 issued in 1998 to Lawson Jr. utilizes a method to enhance a turbocharger by re-circulating turbocharged air during injection of compressed air to the intake of an internal combustion engine. This helps to provide a higher flow of hot expanding gases to enhance the pressure differential in the turbine housing.

U.S. Pat. No. 6,826,910 issued to M. Easton in 2004 discloses an internal combustion engine that includes an air amplifiers to increase airflow. Air amplification with a high-pressure supply provides a practical way to for creating a large airflow needed to generate higher power for rear wheels. When synchronized to the valve openings, the efficiency is enhanced while adding to the system complexity. These additions also apply to an engine with a supercharger of turbocharger. When used in the exhaust path, the air amplifiers can also help scavenge exhaust gases from the cylinder for added power.

A most all devices and methods mentioned above have a common objective, which is to use compressed air from a source such as a pump or tank and supply the compressed air to the intake manifold of the combustion engine directly or through some auxiliary boosting device, one above being an air amplifier.

The use of compressed air on even moderately sized engines requires a large flow of compressed air. There are physical limitations on the flow rate of compressed air into ambient pressure. Physics dictates the speed of sound is the limit at which air will flow through a nozzle from an external tank. Therefore for a given valve diameter or nozzle there is a limit to the flow rate. It is possible to have larger diameter nozzles but controlling the flow with large valves becomes much less practical. An air flow amplifier as mentioned in the above patent by M. Easton, however, has great potential. It is a device that entrains a large volume of a secondary air flow from a surrounding atmosphere by means of a high-speed primary flow of pressurized air to the air amplifier from the external source. Air amplifiers can produce large flow rates that are powerful.

A common disadvantage, however, of all known devices of the aforementioned type is that no effort is made to decrease the heaviness of the rotating assembly of the turbocharger, but rather inventors cope the heaviness by using compressed air boosting methods mentioned above. Considering that the hot expanding exhaust gas from an internal combustion engine is what typically drives a turbocharger and that heat-resistant materials are typically heavy, the compressed air boosting methods to combat the heaviness of the turbocharger are, therefore, dependent on the turbocharger, that is dependent on the hot expanding exhaust gases from an internal combustion engine.

A centrifugal blower, however, can have a light-weight assembly because there is no turbine needed and because it is driven from the crankshaft via a pulley or gearing system. However, such a method requires more power than an exhaust-driven turbocharger because of the surface-to-surface contact between the parts of the gearing or pulley system. Another disadvantage of using gears or pulleys is that the power, required to increase impeller speed goes up dramatically because of the friction associated with the gearing or pulley system, increases dramatically as speed is increased. Such a centrifugal blower cannot be readily turned by hand, which labels it a high power consumption machine needing more power than necessary, unlike a turbocharger which can be readily spun by turning either the compressor or turbine wheel, especially if the turbocharger is supported by ceramic bearings. This makes turbochargers much more efficient than centrifugal blowers.

OBJECTS AND SUMMARY

Accordingly, it is an object of the invention to provide a fluid flow amplifier in combination with a machine that requires a flow of compressed air for use as a forced induction component for an internal combustion engine, or as an air compressor for pneumatic applications instead of a prior-art turbocharger, which is dependent on exhausts from an internal combustion engine, or instead of a centrifugal blower which needs crankshaft or electrical power with a step up gearing ratio, or a pulley system. It is another object to provide a fluid flow amplifier that generates a primary gas flow from a self-contained source of a pressurized gas or from an air compressor powered by the engine. It is a further object to significantly reduce the weight of the rotating mass of the turbocharger. It is another object to provide a combustion engine with the aforementioned device that makes it possible to enhance the operation of the engine for a limited but powerful forced induction moment, or when the latter works in harsh conditions, e.g., at high altitudes or with heavy loads, i.e., when the engine cannot develop sufficient power without the use of auxiliary enhancing means. It is still a further object to provide a fluid flow amplifier, which can be equipped with means for cooling a primary air flow prior to admission thereof to the chamber of the air amplifier. It is a further objection of the present invention to increase turbine efficiency by routing the exhaust from the turbine to the compressor, considering the flow came from the fluid flow amplifier, which is clean atmospheric air. This routing of exhaust gives benefits of lowering the backpressure of the turbine, for an increase in total speed of the turbocharger.

In accordance with the present invention, a fluid flow amplifier and an air compressor that are used as components of a forced induction system or as an air compressor system for pneumatic applications include a self-contained source of a pressurized gas, e.g., a small compressor, or a container with a compressed gas, e.g., compressed air, that is connected to an annular chamber of a fluid flow amplifier. Prior to admission to the fluid flow amplifier, the primary flow can pass through a cooler that lowers the temperature of the pressurized air that enters the fluid flow amplifier. The pressurized airflow then follows a Coanda profile and proceeds in a desired flow direction in a conduit. The aforementioned pressurized airflow generates a low-pressure area at the center of the conduit that entrains a high volume of air from the ambient atmosphere and thus draws this air into the conduit at high velocity. As a result, the high-volume high-velocity airflow drawn from the ambient air is combined and mixed with the cool pressurized airflow. The fluid flow amplifier is directly connected to the inlet of a turbine housing of a turbocharger contained in the system. The cooled high-volume and high-velocity flow enters the turbine housing and drives the turbine, due to the pressure difference in the working medium between the turbine housing inlet and outlet. The turbine transfers its energy to the centrifugal compressor, which responds very quickly due to the low inertia characteristics.

The fluid flow amplifier used in the present invention is described in U.S. Pat. No. 5,402,938 issued in 1995 to Sweeney, which is incorporated herein by reference. This is a fluid flow amplifier of a plug-and-body-style with a shim, utilizing the Coanda profile for air entrainment from a primary pressurized airflow.

DETAILED DESCRIPTION

Preferred Embodiments

The inventors herein found out that if an flow amplifier (that operates on the principle of entraining a large volume of air as a secondary flow under the effect of a primary high-speed flow supplied from an external source) is used instead of a turbocharger or additionally with the turbocharger, it becomes possible to significantly improve the construction of a turbocharger by dramatically reducing the rotational inertia and by using materials that are not concerned with heat issues of hot expanding exhaust gases, or high friction gearing or pulley systems. This benefit allows for freeing up of needed power to drive the turbocharger, which leads to lower power requirements to produce compressed air for pneumatic applications, such as force inducting an internal combustion engine.

The second aspect of the invention is based on increasing a temperature difference between the working medium at the entrance to the turbine and the working medium at the exit from the turbine. More specifically, it is known that a turbocharger constitutes a heat machine the efficiency of which in ideal case is proportional to $1-T_0/T_1$, where $T_1$ is a temperature of a working medium, and $T_0$ is a temperature of a cooling medium.

At constant temperatures of hot ($T_1$) and cold ($T_0$) sources, the following formula can be written for the maximal thermal efficiency of a heat machine, based on the previous formula:

$$h_t = 1 - T_0/T_1.$$

The smaller the ratio $T_0/T_1$ the closer the conditions to the ideal machine, i.e., the greater the difference of temperatures between the inlet to the turbine and the outlet from the turbine, the higher is the efficiency of the machine. The present invention is based on this conception and consists of providing a fluid flow amplifier with the option of using an intercooler for cooling pressurized air prior to feeding thereof to the fluid flow amplifier for use as a primary flow that entrains an ambient air as a secondary flow.

Considering the flow of the fluid flow amplifier is smooth unlike the exhausts of an internal combustion engine, which pulses, the turbine efficiency is greatly increased. The turbine efficiency is also increased by routing the exhaust of the turbine to the compressor, which lowers the backpressure of the turbine.

Figure 4:
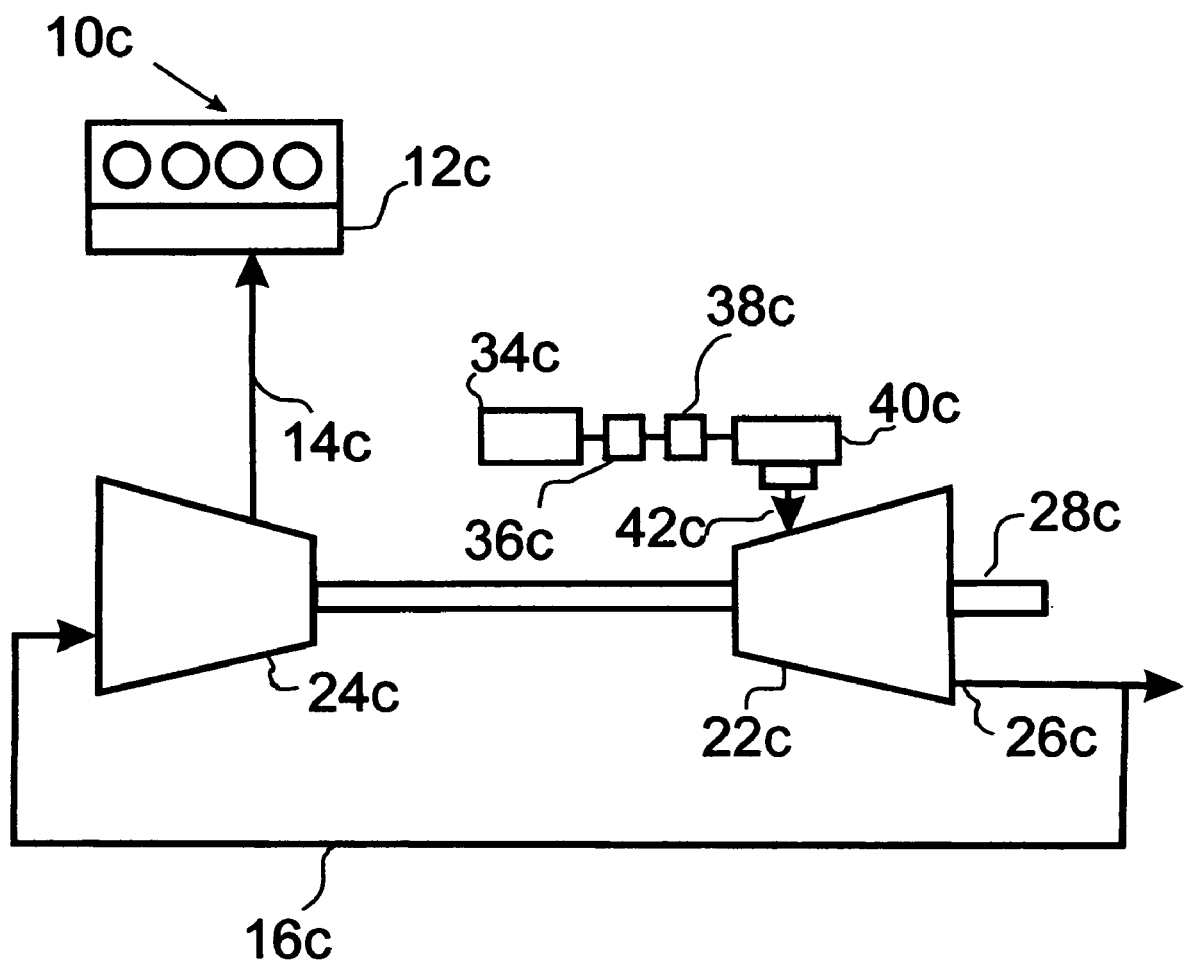
FIG. 4 is a schematic view of an arrangement of the present invention that illustrates a fluid flow amplifier in combination with a turbocharger, and an internal combustion engine

FIG. 4 is a detailed schematic view of an arrangement of a system of the present invention that contains a fluid flow amplifier in combination with a turbocharger, and an internal combustion engine. The system consists of the following components: a turbine 22c that is driven into rotation by a gas flow; a pressurized fluid source 34c, such as a container with a compressed gas, an auxiliary small compressor that takes power from the turbine shaft, or a direct supply from a compressed air line (not shown); a fluid flow amplifier 40c, e.g., of the type disclosed in U.S. Pat. No. 5,402,938 (issued in 1995 to R. Sweeney), that is located between the pressurized fluid source 34c and the turbine 22c with a flow control valve 36c and an intercooler 38c located between the pressurized fluid source 34c and the fluid flow amplifier 40c; a centrifugal compressor 24c driven into rotation by an output shaft 28c of the turbine 22c; and a fluid channel 16c between an exhaust 26c of turbine 22c and the input port of the centrifugal compressor 24c. The valve 36c may be a computer control valve, manual valve, or a solenoid valve. The intercooler 38c be, e.g., an air-to-water intercooler, air-to-dry-ice intercooler, etc. Lastly is an internal combustion engine 10b containing an air intake 12b.

The system operates as follows. A pressurized fluid source 34c supplies a fluid under pressure, e.g., compressed air, through the fluid control valve 36c, the intercooler 38c, and the air flow amplifier 40c to a turbine 22c. The compressed air is made cooler after passing through the intercooler 38c. As the cooled pressurized air flow passes through the air flow amplifier 40c, the latter, in a manner described in U.S. Pat. No. 5,402,938, entrains a secondary air from the ambient atmosphere under the effect of the primary compressed air supplied from the pressurized fluid source 34c. The cold high-volume and high-velocity fluid flow shown in FIG. 4 by arrow 42c is produced as a result of mixing of the primary compressed air with the secondary ambient atmospheric flow.

The cold high volume-high velocity mixed fluid flow 42c enters the turbine 22c and expands to form a flow shown by the exhaust 26c. The turbine 22c transmits the power provided by the cold high-volume high-velocity mixed fluid flow 42c to a shaft 28c, which transfers the power to the centrifugal compressor 24c being connected to the shaft 28c. The centrifugal compressor 24c receives a portion of low-pressure air through the channel 16c and readily spins at a high velocity. The centrifugal compressor 24c compresses the air to a high pressure level, so that the compressed air, which is exhausted from the compressor 24c in the form of a high-pressure flow 14c, which is supplied to the air intake 12c of the internal combustion engine 10c. If the pressurized fluid source 34c is off, the air intake 12c will receive air through the turbocharger (not shown).

Such components of the system shown in FIG. 4 as the turbine 22c and the centrifugal compressor 24c can be made of low-density materials, preferably with the density lower than that of aluminum. These components can be made, e.g., from a magnesium alloy such as Ia-141, which has a density about half of aluminum casting alloy but is comparable with aluminum in strength. Due to the use of a light material such as magnesium alloy Ia-141, it becomes possible to reduce the total weight of the compressor and turbine to about 0.05 kg, while a T3 50 trim turbocharger of a comparable size produced by Garrett, where aluminum is used for the compressor and Inconel is used for the turbine, weighs about 0.3 kg. Thus the system of the invention with the use of an intercooler and the new arrangement of the light-weight components results in weight reduction of up to about 83%. The components can also benefit from air bearings rather than conventional ball bearings, which have surface contact between the rolling elements an require the use of an oiling system. Air bearings can allow for the primary pressurized fluid flow to the air flow amplifier to be shut off and still maintain a high rotational velocity, which can provide energy recovery and saving capabilities.

Figure 5:
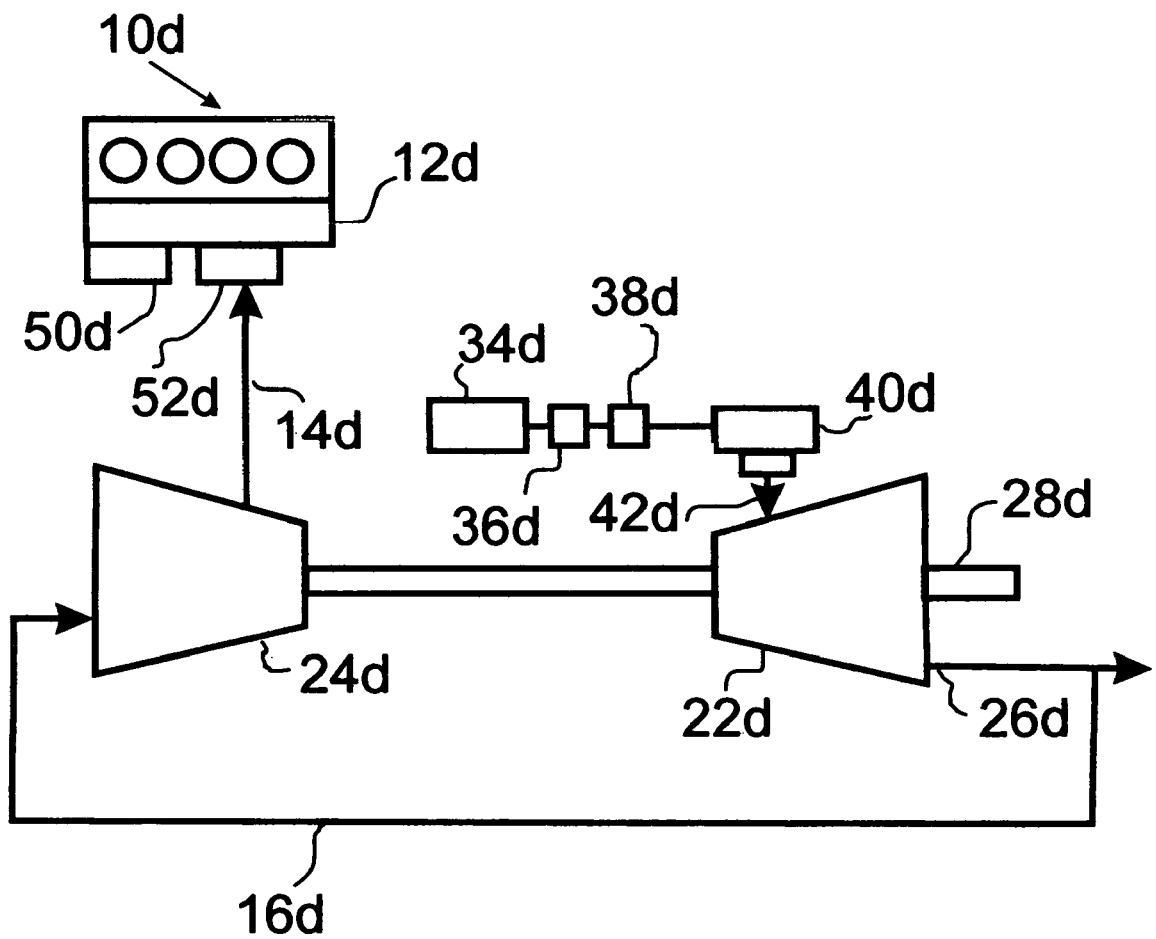
FIG. 5 is a schematic view of an arrangement of the present invention similar to one shown in FIG. 4, but with sequenced valves for the air intake of an internal combustion engine.

FIG. 5 is a diagram similar to one shown in FIG. 4. In FIG. 5, the components of the system which are identical to those of the system of FIG. 4 are designated by the same reference numerals with an addition of letter "d". The description of FIG. 5 and its operation of the system as a whole is partially omitted in view of similarity with the system of FIG. 4. The difference is that in the system of FIG. 5 the air intake 12d contains the solenoid valves 50d and 52d. Valve 50d allows the air intake 12d of the internal combustion engine 10d to draw in regular atmospheric air, while valve 52d allows the air intake 12d to be force inducted by receiving a high-pressure flow 14d coming from centrifugal compressor 24d. When force induction is not needed and therefore the pressurized fluid source 34d is not used, valve 52d stays closed, while valve 50d remains open. When force induction is needed the pressurized fluid source 34d is used, and valve 50d is closed, while valve 52d is open. The opening and closing sequence of valves 50d and 52d make it possible to prevent exit of the high-pressure flow 14d to the atmosphere through the valve 50d when tight seal is needed for forcing the air to the intake 12c. Therefore, during force induction of the air intake 12d the valve 50d should be closed.

Figure 6:
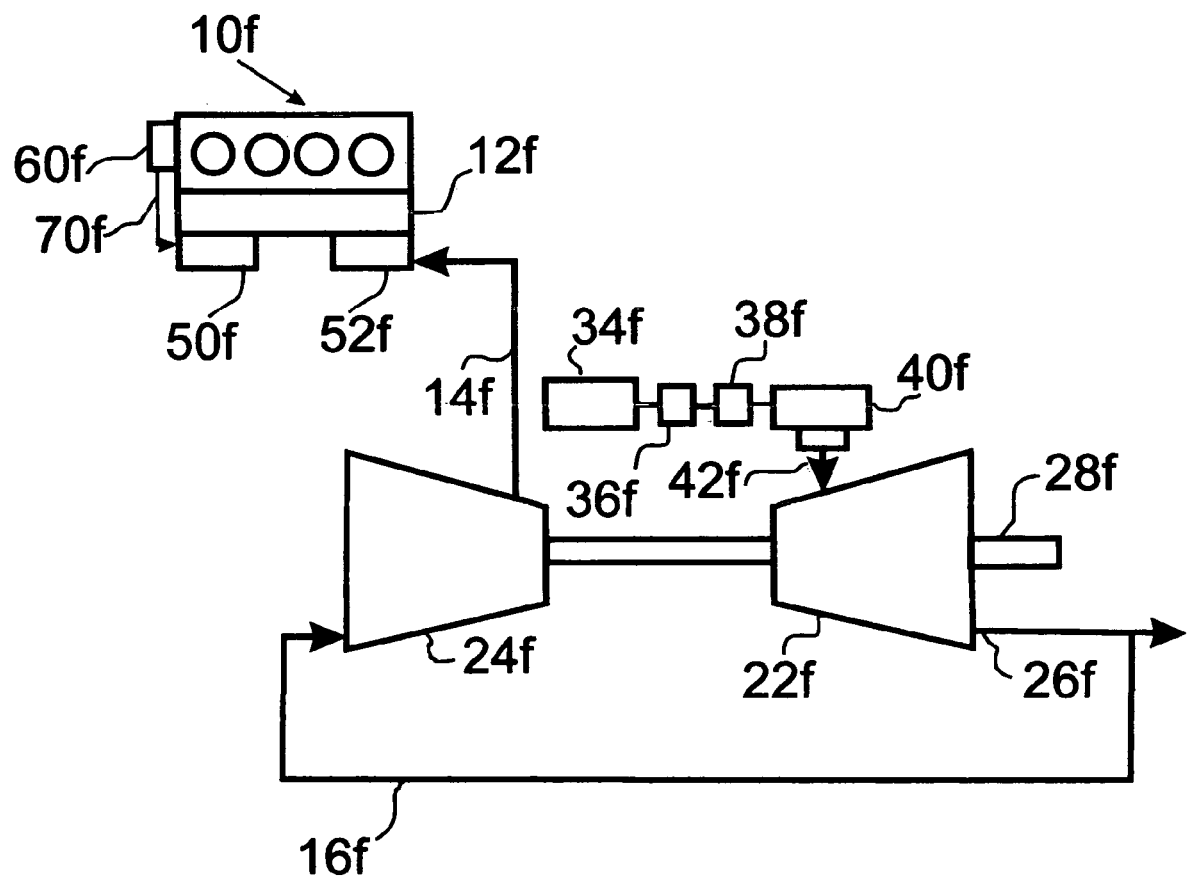
FIG. 6 is a schematic view of an arrangement of the present invention similar to one shown in FIG. 5 but including a conventional turbocharger for twin turbocharging.

FIG. 6 is a diagram similar to one shown in FIG. 5. In FIG. 6, the components of the system which are identical to those of the system of FIG. 5 are designated by the same reference numerals with an addition of letter "f". The difference is that the system of FIG. 6 contains a conventional turbocharger 60f that produces a high-pressure flow 70f. The description of FIG. 6 and operation of the system as a whole is partially omitted in view of similarity with the system of FIG. 5. The air intake 12f of the system of FIG. 6 is equipped with solenoid valves 50f and 52f that are sequenced differently. Valve 50f receives the high-pressure flow 70f from the turbocharger 60f, which force inducts the air intake 12f of the internal combustion engine 10f, while valve 52f allows the air intake 12f to be force inducted by receiving the high-pressure flow 14f coming from a centrifugal compressor 24f. When extra force induction is not needed and therefore the pressurized fluid source 34f is not used, the valve 52f stays closed, while valve 50f remains open making the internal combustion engine 10f a regular turbocharged engine. When extra force induction is needed the pressurized fluid source 34f is used, and the valve 52f is opened allowing for the high-pressure flow 14f to be received by the air intake 12f. The opening and closing sequence of valves 50f and 52f makes it possible to selectively use the engine with or without a turbocharger.

Figure 7:
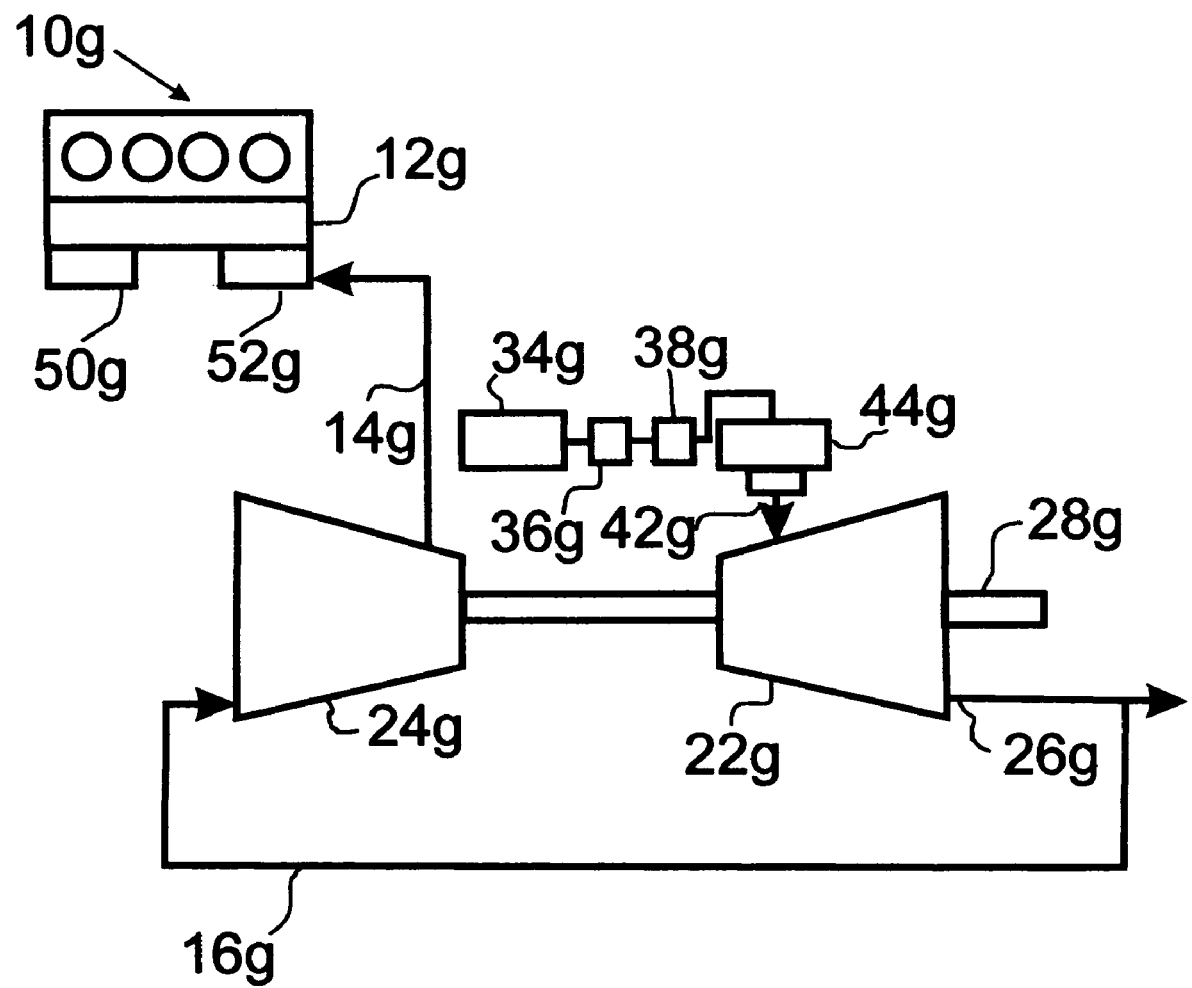
FIG. 7 is a schematic view of an arrangement of the present invention similar to one shown in FIG. 5 but for a nozzle type air amplifier.

FIG. 7 is a diagram similar to one shown in FIG. 5 but for a nozzle type air amplifier 44g. In FIG. 7, the components of the system which are identical to those of the system of FIG. 5 are designated by the same reference numerals with an addition of letter "g", and description of their operation and operation of the system as a whole are omitted in view of similarity with the system of FIG. 5. Thus, in FIG. 7 the centrifugal compressor is designated by reference numeral 24g, the turbine is designated by 22g, the shaft by 28g, etc. The nozzle type air amplifier 44g can be viewed at (http://www.rexresearch.com/coanda/1coanda.htm) where various versions of air amplifiers with Coanda profiles are illustrated.

Figure 8:
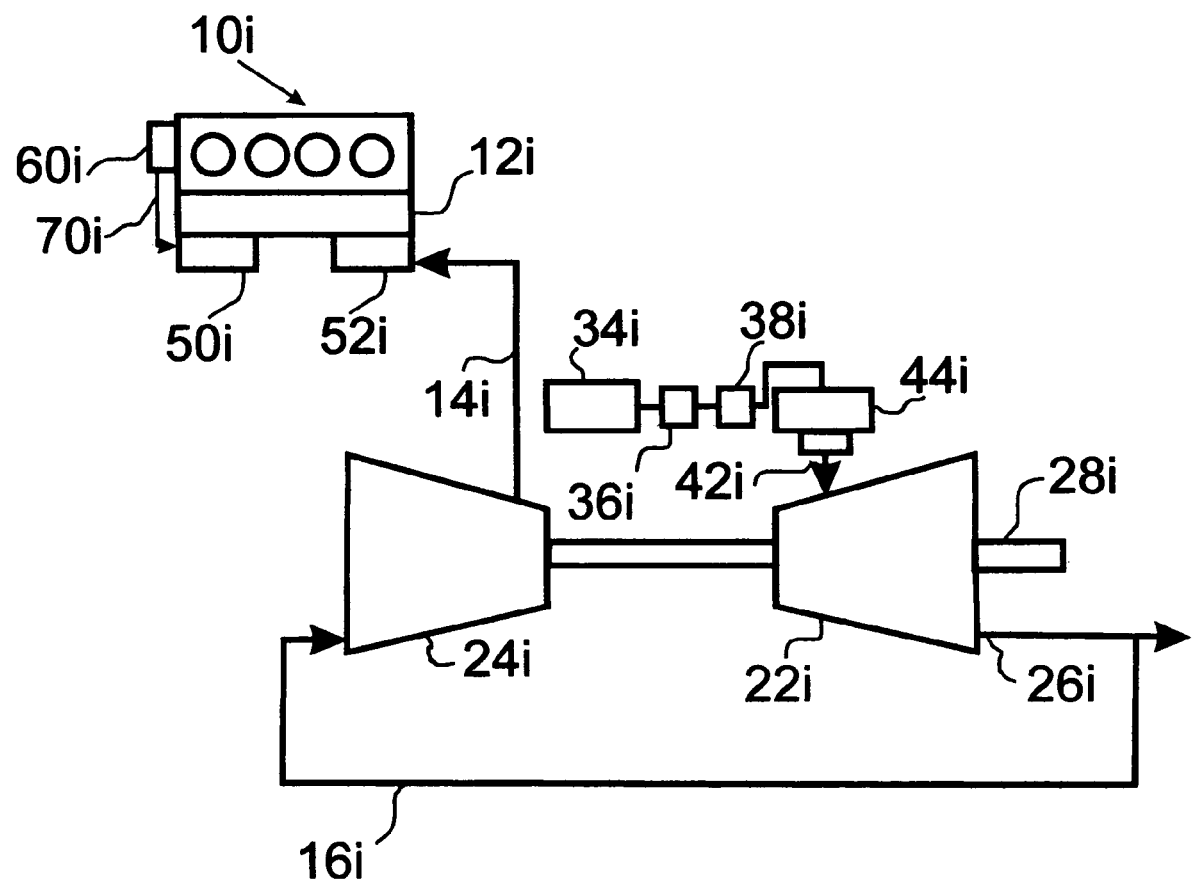
FIG. 8 is a schematic view of an arrangement of the present invention similar to one shown in FIG. 6 but for a nozzle type air amplifier.

FIG. 8 is a diagram similar to one shown in FIG. 6 but for a nozzle type air amplifier 44i. In FIG. 8, the components of the system which are identical to those of the system of FIG. 6 are designated by the same reference numerals with an addition of letter "i" and description of their operation and operation of the system as a whole are omitted in view of similarity with the system of FIG. 6. Thus, in FIG. 8 the centrifugal compressor is designated by reference numeral 24i, the turbine is designated by 22i, the shaft by 28i, etc. The nozzle type air amplifier 44i can be viewed at (http://www.r-exresearch.com/coanda/1coanda.htm) where various versions of air amplifiers with Coanda profiles are illustrated.

Figure 9:
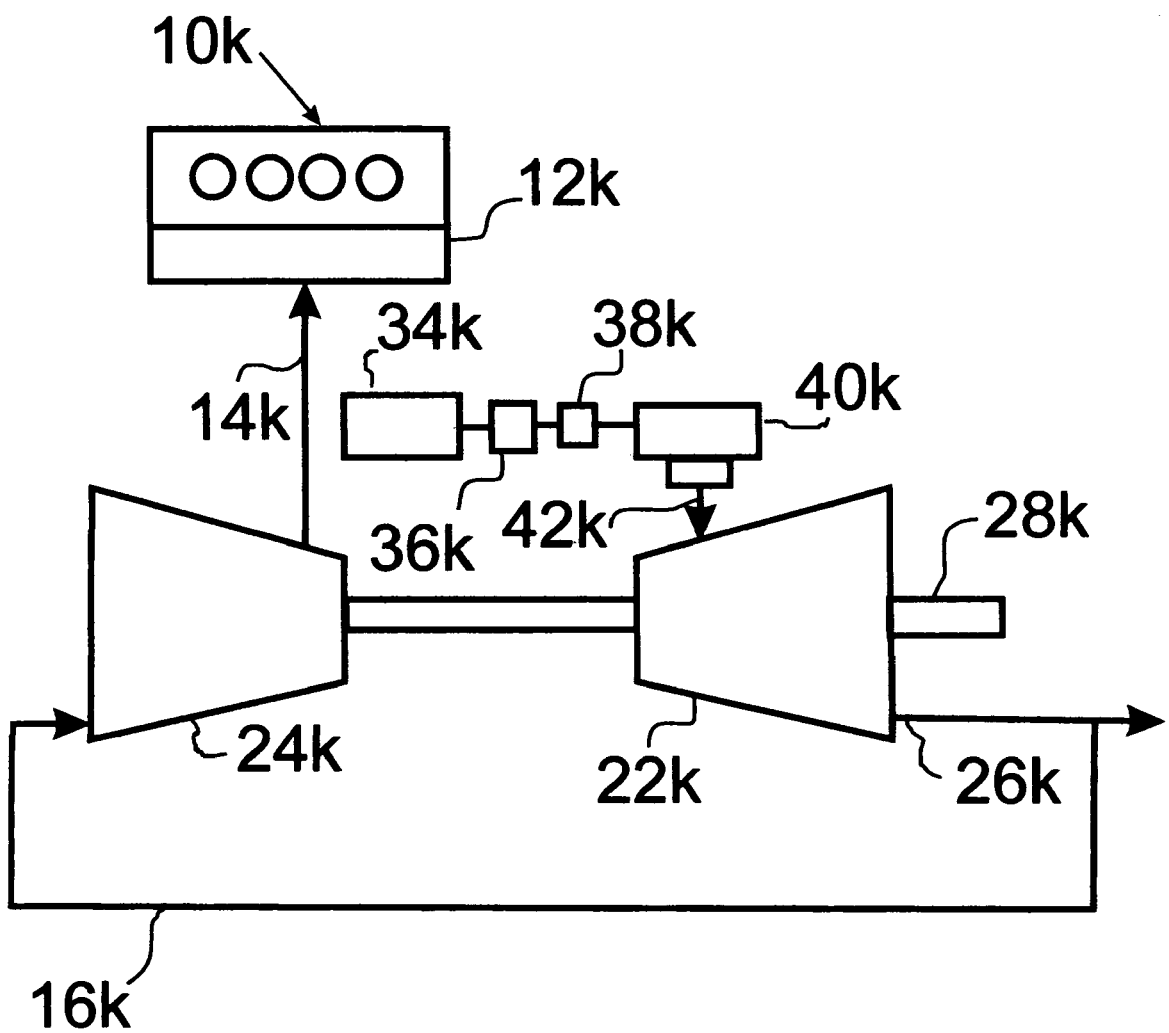
FIG. 9 is a schematic view of an arrangement of the present invention similar to one shown in FIG. 4 but for a system without intercooling.

FIG. 9 is diagram similar to one shown in FIG. 4 but for a system without intercooling. In FIG. 9, the components of the system which are identical to those of the system of FIG. 4 are designated by the same reference numerals with an addition of letter "k", and description of their operation and operation of the system as a whole are omitted in view of similarity with the system of FIG. 4. Thus, in FIG. 9 the centrifugal compressor is designated by reference numeral 24k, the turbine is designated by 22k, the shaft by 28k, etc. In FIG. 9 the system without intercooling also applies for FIGS. 5-8 considering they all refer back against each other, with FIG. 4 being the first system in which FIGS. 5-8 refer back to, thus FIGS. 5-8 can also be operated without an intercooling system.

Having described the arrangement of the components of the proposed system in a block-diagram form, let us consider now some components of the system in more specific form.

Figure 10:
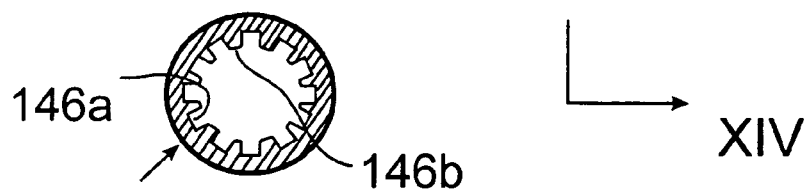
FIG. 10 is a longitudinal sectional view of an air flow amplifier used in the systems of the present invention.

An example of an air flow amplifier 40c (FIG. 4) suitable for the purposes of the present invention is shown in FIG. 10, which is a longitudinal cross-sectional view of the amplifier. As in the arrangement of FIG. 4, the air flow amplifier 40c is connected to the turbine 22c. The amplifier 40c contains two main parts, i.e., a plug 112 to be connected to an engine and a fluid flow amplifier body 114. An O-ring 116 is typically used to seal the pressurized mating surfaces between the plug 112 and the body 114. For connection to the turbine 22c, the plug portion 112 may have an outer thread 118. The air flow amplifier 40c has on one end thereof an ambient air inlet 120 in the form of an annular mouth with a tapered inner surface 122 through which the ambient air drawn into the throat 124 and further through a guide channel 126 to an outlet port 128 of the air flow amplifier 40c.

In the embodiment shown in FIG. 10, the body portion 114 of the air flow amplifier 40c has an annular chamber 130 one side of which is connected via a control valve 132 and an intercooler 134 to a source of a pressurized gas, e.g., a container 136 with compressed air. The container 136 with compressed air is shown only as an example, and the compressed air may be supplied to the air flow amplifier by a small compressor (not shown in FIG. 10). The control valve 132 can be, e.g., a computer controlled valve, a manual valve or a solenoid valve.

Figure 14:
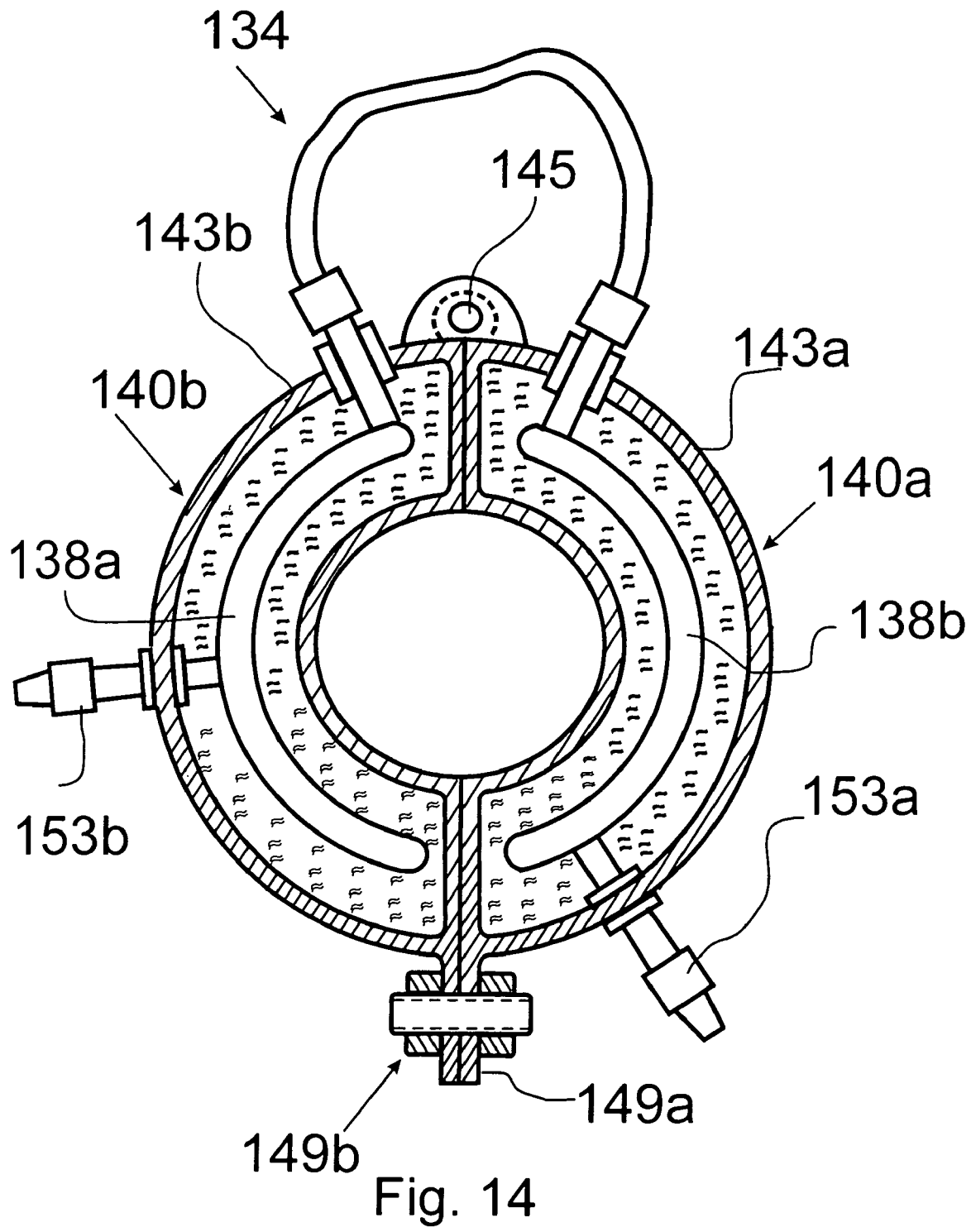
FIG. 14 is a sectional along line XIII-XIII of FIG. 10 illustrating the construction of the cooling unit for the air amplifier of the invention

The container 136 with compressed air is connected to the annular chamber 130 of the air flow amplifier 40c by cooling pipe segments 138a and 138b that passe via a cooling unit 134 that comprises a pair of semi-circular chilling elements 140a and 140b which surround the cooling pipe segments 138a and 138b. The construction of the cooling unit 134 is shown in more detail in FIG. 14. More specifically, both element 140 a and 140b can be easily removed from casing parts 143a and 143b that are pivotally connected at 145 and secured to each other at their flanged parts 149a and 149b. The pipe segments 138a and 138b are made in the form of a battery of interconnected semicircular members. In FIG. 10, reference numeral 153a designates an input pipe union for the supply of compressed air to the pipe segments, and reference numeral 153b designates an output pipe unit for exit of the chilled primary flow from the pipe segments 138a and 138b.

An example of the aforementioned low-temperature substances 140a and 140b that keep low temperature over a long time and cools the air flow passing through the cooling pipe may be a re-usable and freezable packaged chiller medium of the type marketed by Rubbermaid, Inc. of Wooster, Ohio under the trade name Blue Ice.

As seen in FIG. 10, the annular chamber 30 is formed between the body 14 and the plug portion 12. The aforementioned throat 124 is located in the area where the tapered air inlet 122 merges the guide channel 126. In the area where the narrow passage 142 that connects the annular chamber 130 with the throat 124 and with the guide channel 126 the throat 124 has a Coanda profile 144.

Figure 11:
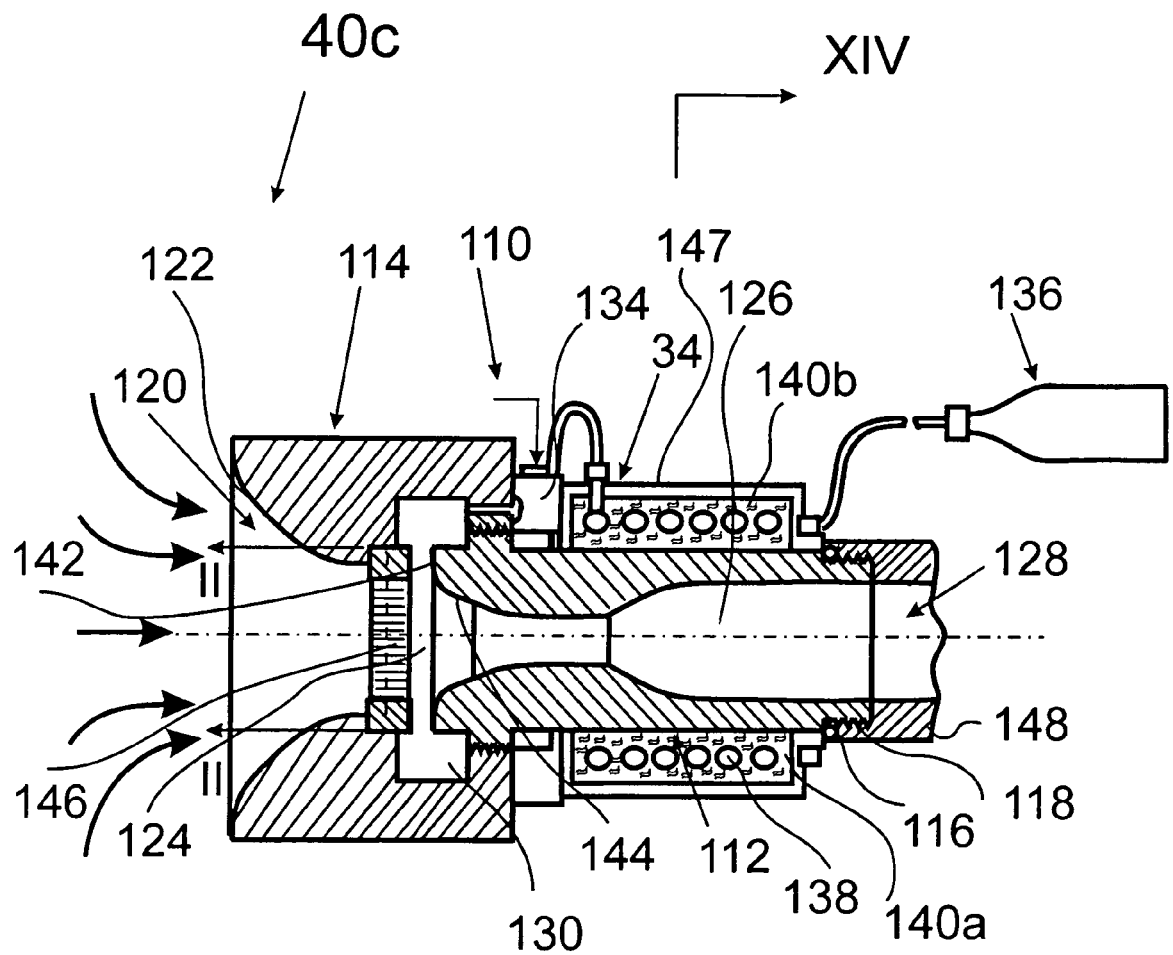
FIG. 11 is a sectional view along the line XI-XI of FIG. 10 illustrating a shim with a plurality of nozzle slits.

Installed in the throat 124 is also a shim 146 shown in a simplified plan view in FIG. 11 with a plurality of slits 146a that act as nozzles for air of the primary flow when this air leaves the narrow passage 142 and enters the throat 124. More about the shim 146 can be read in U.S. Pat. No. 5,402,938 issued in 1994 to Sweeney. In general, the shim has projections 146b and slits 46a between the projections which function as small nozzles that inject the entrained ambient air to the guide channel 126.

The air flow amplifier 40c of FIG. 10 that is intended for use as a component of a forced induction system of FIG. 4 operates as follows.

Figure 1:
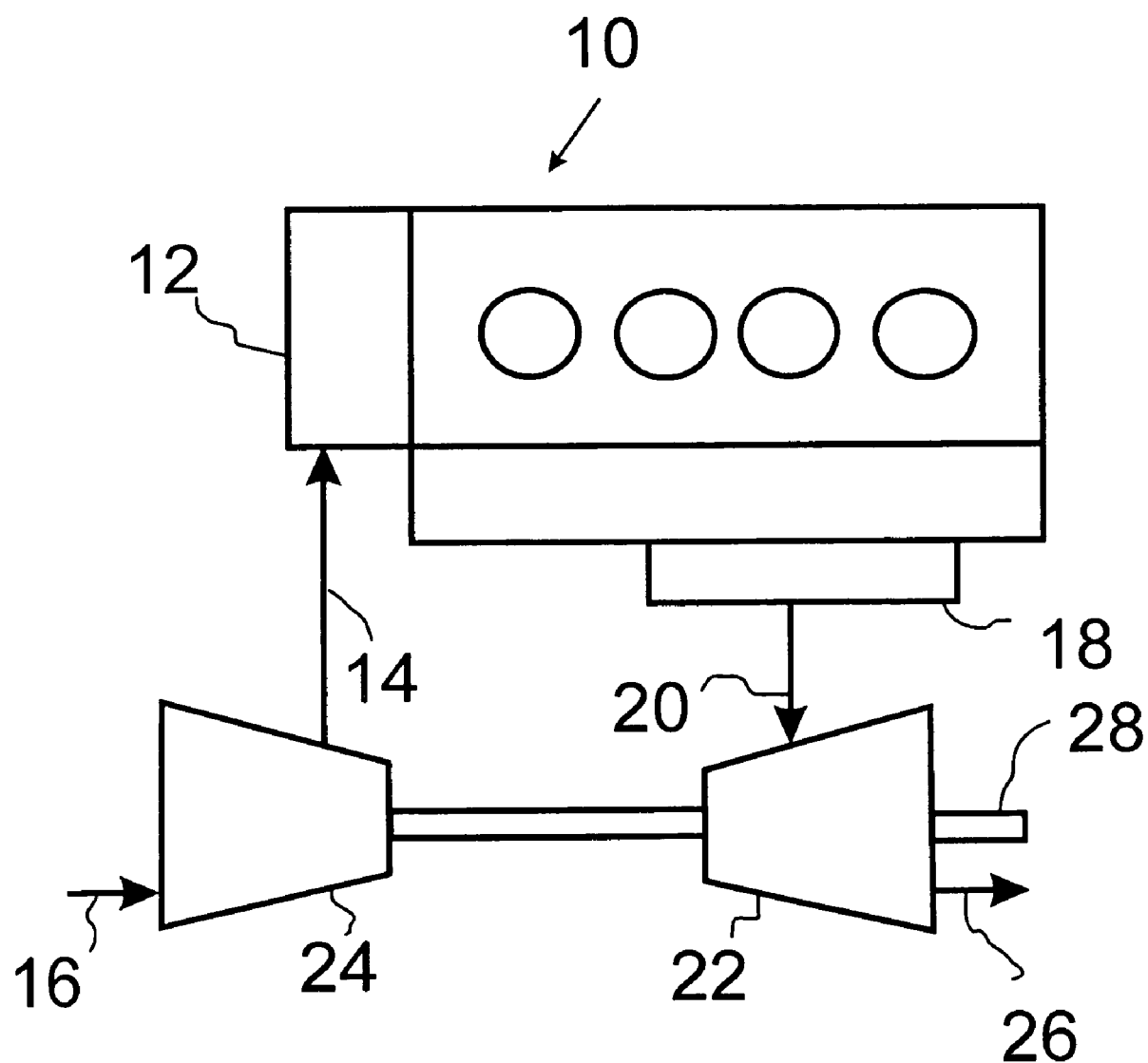
FIG. 1 is a simple schematic view illustrating a known arrangement consisting of an internal combustion engine and a turbocharger powered by exhaust gases from the exhaust system of the engine.
Figure 2:
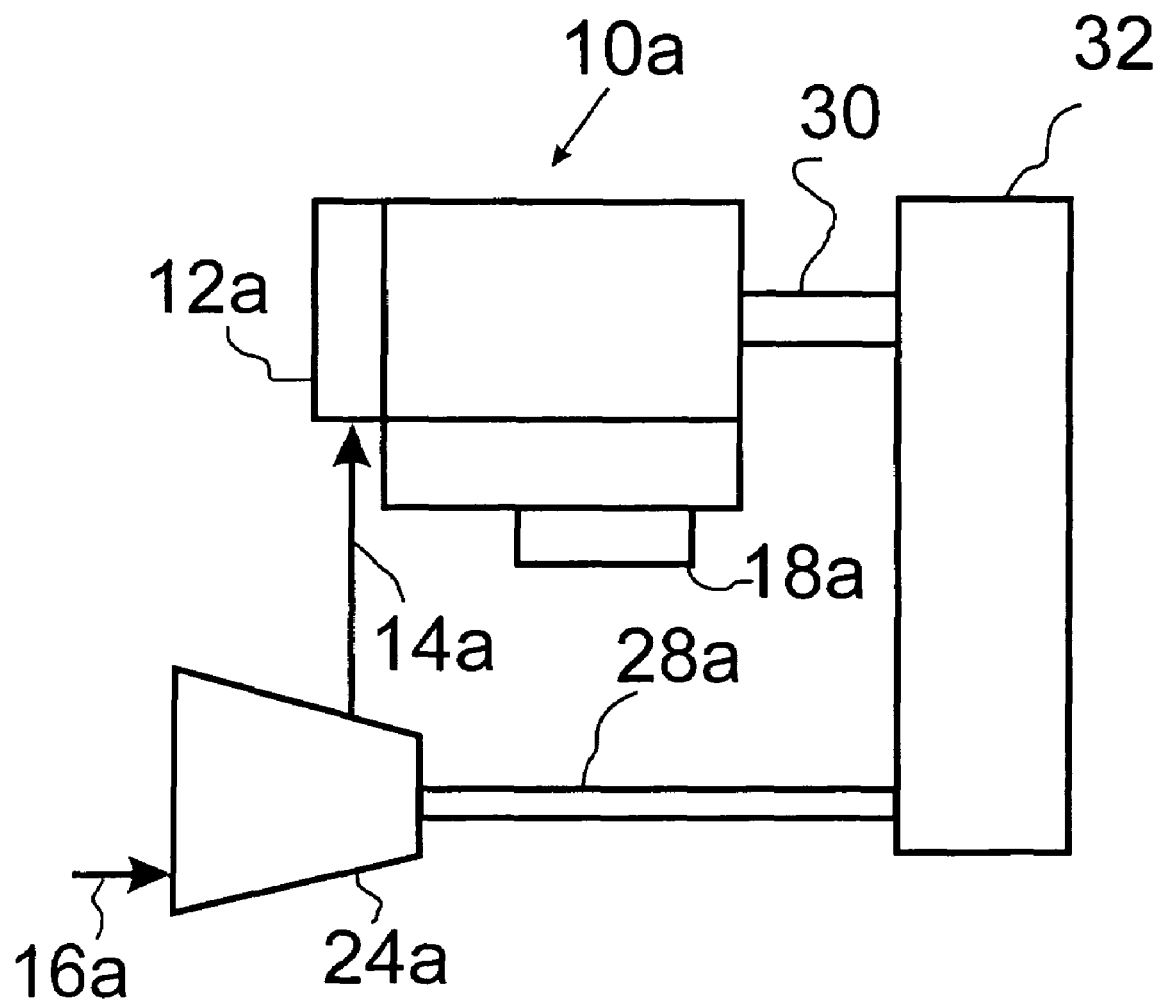
FIG. 2 is a simple schematic view illustrating a known arrangement consisting of an internal combustion engine and a centrifugal blower powered by crankshaft power from the engine.
Figure 3:
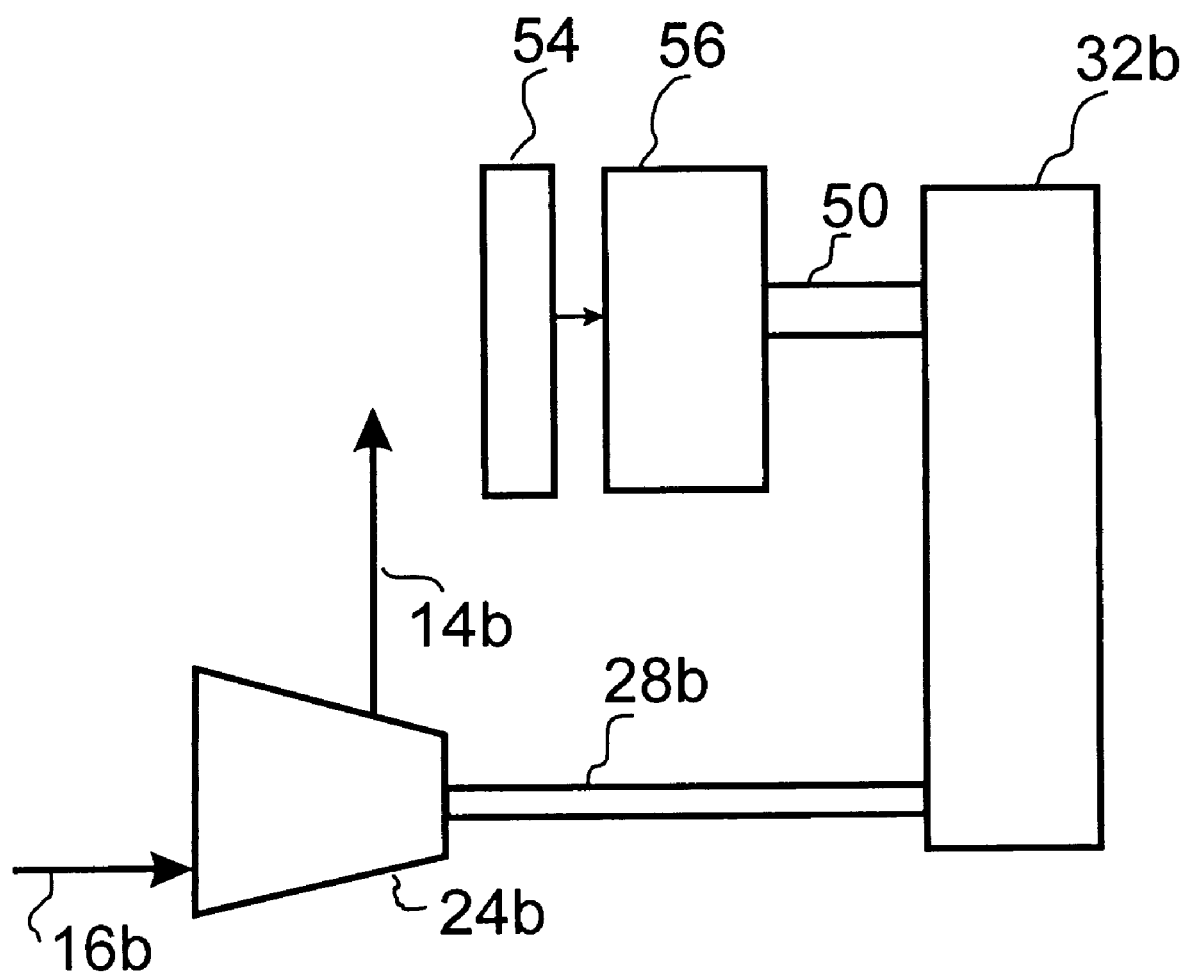
FIG. 3 is a simple schematic view of a known arrangement where a centrifugal blower is driven by an electric motor.

When the pressurized air leaves the passageway 142, it is discharged through the slits 146a (FIG. 11) of the shim 146 to the guide channel 126 and through the Coanda effect entrains a secondary flow of ambient air, in the direction shown by the arrows in FIG. 10, to the air inlet 120 in a larger quantity as compared to the amount of pressurized air of the primary flow. The shim 146 allows the pressurized air to follow the Coanda profile 144 over a wider range, resulting in more ambient airflow and increased resistance to backpressure. Both flows are mixed, and the resulting mixed flow of a high volume and high velocity travels to the air outlet port 128 of the air flow amplifier 40c, and then further to the destination, which in the case of the present invention is a turbine 22c. In FIG. 1A, reference numeral 148 designates an air intake pipe of the turbine 22c (FIGS. 4 and 7).

Figure 12:
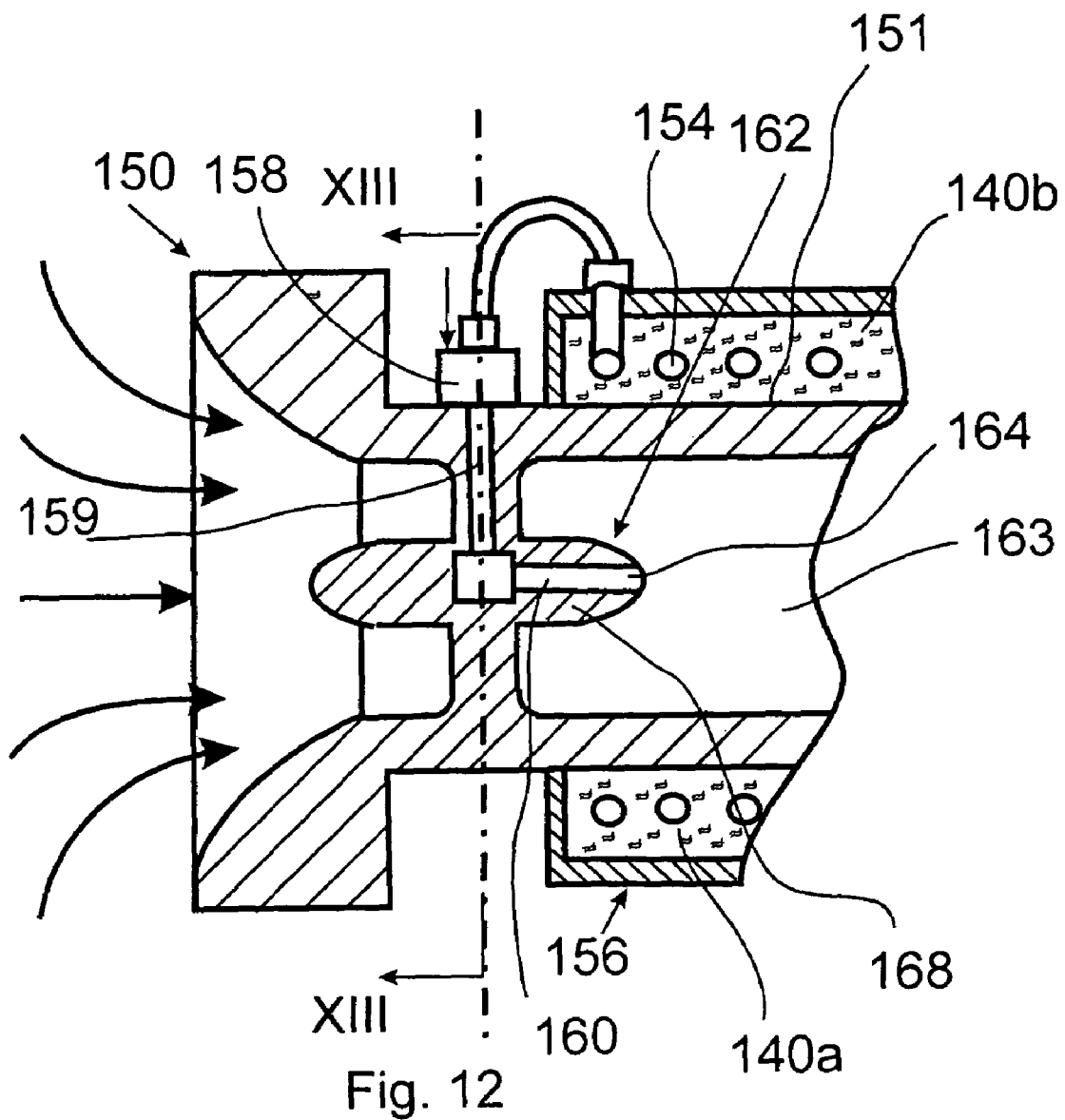
FIG. 12 is a longitudinal sectional view of an air flow amplifier of a nozzle type suitable for the systems of the present invention.

FIG. 12 illustrates an air flow amplifier 150 of a nozzle type that, according to the invention, also can be used instead of a turbocharger or in combination with a turbocharger for an internal combustion engine. In the embodiment of FIG. 12, one end of the air flow amplifier 150 is connected to an air intake pipe of the engine, and the other end of the air amplifier 150 is connected to a source of a compressed air, e.g., of the same type as the container 136 with compressed air (FIG. 10). The source of compressed air is connected to the air flow amplifier via a helical pipe 154 wound around the cylindrical body 151 of the air amplifier 150. The pipe 154 passes through a cooling unit 156, of the same type as the cooling unit 134 (FIG. 10), and a control valve 158.

Figure 13:
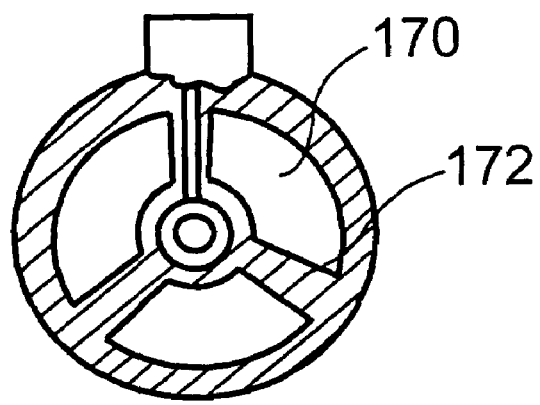
FIG. 13 is a cross-sectional view along line XIII-XIII of FIG. 12.

The air amplifier 150 has a channel 159 that is started at the outlet of the valve 158 and is ended at an axial channel 160 of a nozzle 162 that has an outlet opening 164 at the end that faces the guide channel 163 for guiding a mixed flow towards the turbine 22c (FIG. 4). The outer surface of the nozzle 162 is made with a Coanda profile 168 which, as shown by the arrows in FIG. 11, entrains ambient air from the atmosphere to the guide channel 163 through the openings 170 formed between the nozzle holding spikes 172 shown in FIG. 13 which is a cross-sectional view along line XIII-XIII of FIG. 12.

The pressurized air ejected from the outlet opening 164 of the nozzle 162 helps centralize the pressurized air from the air amplifier and entrained a high volume of the ambient air in the form of a secondary high-velocity flow that is mixed in the guide channel 163 with the primary flow of the pressurized air emitted from the outlet opening 164. The enhanced mixed flow of air is sent to device that require a flow of gas, e.g., to the turbine 22c (FIG. 4). The description of the turbine is omitted.

In both embodiments, the cooling units 134 and 156 can be made in the form of two semi-circular halves which contain chilling elements 140a and 140b with connecting flanges as shown in FIG. 9. Prior to use the contents of these elements is frozen in a freezer of a refrigerator and may stay chilled for several hours.

Although the invention has been shown and described with reference to specific embodiments, it is understood that these embodiments should not be construed as limiting the areas of application of the invention and that any changes and modifications are possible, provided these changes and modifications do not depart from the scope of the attached patent claims. For example, any zone within the fluid flow amplifier and air compressor where this is an airflow an intercooler can be used, any compressor style can be used as the compressor instead of a centrifugal air impeller e.g., an axial air compressor fan, any fluid can be compressed by the compressor. Any zone within the fluid flow amplifier and air compressor where heat is developed, a radiator system such as a heat pipe can be used to transfer the heat elsewhere. The internal combustion engine if equipped with the fluid flow amplifier and air compressor can spin the device with just its intake airflow, which will provide self boosting abilities without depleting a pressurized fluid from a container or over using an engine powered air compressor. A separate fluid flow amplifier can be put anywhere where there is an air flow within the fluid flow amplifier and air compressor, such as the exhaust portion. The compressed air developed by the combination of the fluid flow amplifier and air compressor machine can be used for any application desired. Any device that can produce a pressurized fluid such as compressed air, or any pressurized fluid can supply the primary airflow to the fluid flow amplifier e.g., an eight cylinder combustion engine with two cylinders serving as two-stroke air compressors, while the remaining six cylinders operate as a four stroke, or a vessel of pressurized oxygen. The fluid flow amplifier and air compressor can serve as a powerful unit capable of turning a large generator at low cost. An example would be a self contained pressurized vessel of air of sufficient size such that the fluid flow amplifier can drive the air compressor e.g., an all composite two stage 4:1 pressure ratio turbocharger for a long duration. The turbocharger will produce compressed air to which fuel will be added and ignited to produce hot expanding gases to which drives a turbine-generator to produce energy. Power can be drawn from the generator or hot expanding gases to drive another air compressor e.g., a turbocharger to replenish the pressurized vessel when needed such as to have a continuos operation. The total starting energy and needed replenishing energy would be the fluid flow amplifier air consumption rate, while the rest of the energy is used for the producing electricity. The fluid flow amplifier and air compressor can flow its compressed air to a compressor of a conventional turbocharger of an internal combustion engine for high staging pressure discharge, or vise-versa. The fluid flow amplifier and air compressor can have more than one turbine and compressor. the fluid flow amplifier and air compressor can have multiple fluid flow amplifiers instead of one unit.

Although the fluid flow amplifiers presented above typically incorporate the Coanda profile, being a tangible surface and is defined by the word Coanda effect, which is the tendency of a fluid to cling to a surface that is near an orifice from which the fluid emerges, the Coanda profile is only one example of a fluid entrainment system for a fluid flow amplifier and a non-Coanda effect fluid entrainment system also can be utilized in the system of the invention (see, e.g., U.S. Pat. No. 4,046,492 issued in 1977 to Inglis). Many design variations are possible for the fluid flow amplifiers only a few herein presented in which the inventors are aware of.

The invention claimed is:

1. A system of an induced air flow for pneumatic application comprising:
   a machine, operation of which is induced by a flow of compressed air, said machine having an air flow inlet; a source of compressed air;
   a flow control valve;
   an air flow amplifier connected to the source of compressed air; a turbine having an output shaft which is connected to and is driven by said air flow amplifier;
   an air compressor driven by said output shaft of the turbine a; and
   compressed air flow channel that connects said air compressor to said air flow inlet of said machine for inducing operation of said machine.

2. The system of claim 1, further provided with an intercooler located between said source of compressed air and said air flow amplifier, said source of compressed air being selected from a container with compressed air and an auxiliary compressor.

3. The system of claim 2, wherein said intercooler comprises a cooling pipe and a re-usable and freezable packaged chiller medium in contact with said cooling pipe and capable of staying at a low temperature.

4. The system of claim 1, wherein said air flow amplifier is a nozzle-type air flow amplifier.

5. The system of claim 4, wherein said source of compressed air is selected from a container with compressed air and an auxiliary compressor.

6. The system of claim 5, further comprising a fluid flow channel that connects the turbine with the air compressor for enhancing operation of the air compressor.

7. The system of claim 1, wherein parts of said turbine and said compressor are made from a material which is lighter in weight than aluminum or aluminum alloy.

8. The system of claim 1, wherein said air flow amplifier comprises: an air-drawing portion for entraining air from the surrounding atmosphere in the form of a secondary flow; and a primary flow portion connected to said source of compressed air for generating a primary air flow in order to cause said air-drawing portion to entrain air from the surrounding atmosphere and combine said air of the secondary flow with said compressed air of the primary flow in order to form an enhanced fluid flow of an increased volume and speed.

9. The system of claim 8, wherein said air-drawing portion has an air drawing profile.

10. The system of claim 9, wherein said profile is a Coanda profile.

11. The system of claim 1, further comprising a second fluid flow channel that connects the turbine with the air compressor for enhancing operation of the air compressor.

12. A system of an induced air flow for pneumatic application comprising:

a machine, operation of which is induced by a flow of compressed air, wherein said machine includes an air flow inlet;

a source of compressed air;

an air flow amplifier;

an intercooler installed between the source of compressed air and the air flow amplifier, wherein said intercooler cools down a flow of compressed air passing from the source of compressed air to the air flow amplifier;

a flow control valve;

wherein the flow control valve adjusts said flow of compressed air delivered to said air flow amplifier;

a turbine, said turbine further comprising:

a turbine output shaft;

a turbine inlet to receive said flow of compressed air from said air flow amplifier; and a turbine outlet;

an air compressor driven from said output shaft of said turbine;

a fluid flow channel connecting said turbine outlet to said air compressor for delivering a portion of low pressure air generated/expanded by said turbine to enhance operation of said air compressor; and a compressed air flow channel connecting said air compressor to said air flow inlet of said machine for inducing operation of said machine with said portion of low pressure air generated/expanded by said turbine to be compressed by said air compressor.

13. The system of claim 12, wherein said source of compressed air is selected from at least one of a container with compressed air and an auxiliary compressor.

14. The system of claim 13, wherein said air flow amplifier is a nozzle-type air flow amplifier.

15. The system of claim 13, wherein said air flow amplifier further comprises:

an air-drawing portion for entraining air from the surrounding atmosphere in the form of a secondary flow; and a primary flow portion connected to said source of compressed air for generating a primary air flow in order to cause said air-drawing portion to entrain air from the surrounding atmosphere and combine said air of the secondary flow with said compressed air of the primary flow in order to form an enhanced fluid flow of an increased volume and speed.

16. The system of claim 15, wherein said air-drawing portion has an air drawing profile.

17. The system of claim 16, wherein said profile is a Coanda profile.

18. The system of claim 17, wherein said intercooler comprises a cooling pipe and a re-usable and freezable packaged chiller medium in contact with said cooling pipe and staying at a low temperature.

19. The system of claim 13, wherein said intercooler comprises a cooling pipe and a re-usable and freezable packaged chiller medium in contact with said cooling pipe and staying at a low temperature.

20. The system of claim 12, wherein said turbine and said compressor are made from a material which is lighter in weight than aluminum or aluminum alloy.

21. The system of claim 12, wherein said intercooler comprises a cooling pipe and a re-usable and freezable packaged chiller medium in contact with said cooling pipe and staying at a low temperature.

* * * * *